United States Patent Office.

CONSTANTINE NESSI, OF SAN FRANCISCO, CALIFORNIA.

Letters Patent No. 96,828, dated November 16, 1869.

IMPROVED BEVERAGE.

The Schedule referred to in these Letters Patent and making part of the same.

*To all whom it may concern:*

Be it known that I, CONSTANTINE NESSI, of the city and county of San Francisco, State of California, have invented or compounded an Improved "Beverage or Champagne Musk Lemonade;" and I do hereby declare that the ingredients used, and the manner of mixing or compounding them, to make the said beverage, are described in the following specification.

Into any convenient vessel, I put four and one-half (4½) pounds of loaf or crushed sugar, one-half (½) pound of bruised barley, with one gallon of pure water, and acidulate with five (5) limes or lemons, which I cut into thin slices.

To impart to the beverage a musk flavor, I employ one (1) ounce of basil-weed, or wild basil. This weed or herb may be employed or not, according to taste, yet it will impart an agreeable aroma and flavor to the compound, which is very desirable in warm climates.

I then allow the contents of the vessel to macerate eight (8) or ten (10) days, and strain the liquor through fine muslin or filtering-paper into another vessel, when it is prepared for bottling, after the manner of champagne.

The beverage so prepared and bottled will be fit for drinking in about five (5) days, and will remain wholesome for the space of about forty days.

By this preparation, a healthy and agreeable drink is obtained, which is especially recommended for warm climates, and to persons suffering from nausea.

Having thus fully described my invention,

What I claim, and desire to secure by Letters Patent, is—

The within-described ingredients, mixed or compounded in about the proportions set forth, substantially as and for the purpose specified.

In witness whereof, I have hereunto set my hand and seal.

CONSTANTINE NESSI. [L. S.]

Witnesses:
A. PALTENGHI,
C. W. M. SMITH.